Oct. 8, 1968
J. LEBLANC
3,404,762
ELECTROMAGNETIC APPARATUS SUCH AS CLUTCHES
AND BRAKES INCLUDING FRICTION DISCS
Filed Sept. 9, 1966
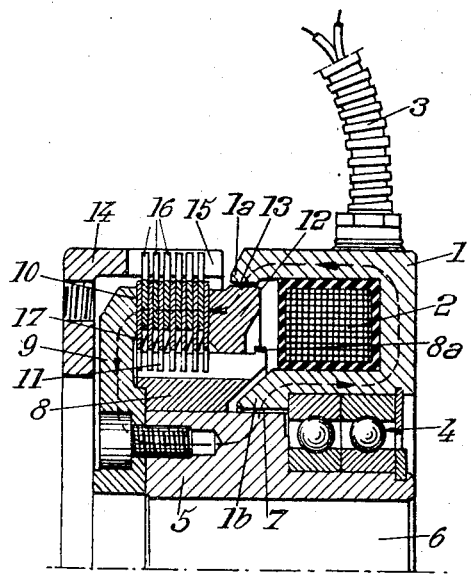
INVENTOR
JEAN LeBLANC
BY
Bailey, Stephens + Huettig
ATTORNEY

United States Patent Office 3,404,762
Patented Oct. 8, 1968

3,404,762
ELECTROMAGNETIC APPARATUS SUCH AS CLUTCHES AND BRAKES INCLUDING FRICTION DISCS
Jean Leblanc, Lyon, France, assignor to Societe Industrielle Generale de Mecanique Appliquee (S.I.G.M.A.), Paris, France
Filed Sept. 9, 1966, Ser. No. 578,238
Claims priority, application France, Sept. 10, 1965, 31,090
3 Claims. (Cl. 192—84)

ABSTRACT OF THE DISCLOSURE

The apparatus is intended to transmit torque from a first part to a second part, at least one of these two parts being rotatable. The apparatus includes the following annular members, mounted coaxially and successively: an electromagnet having an annular extension of its yoke; an armature disposed within this extension; two sets of discs, the discs of one set alternating with the discs of the other set; and an abutment. These members form, together with said first part, a closed magnetic circuit. The discs are slidable axially with respect to the first and second parts; the discs of one set are connected in rotation to the first part, and the discs of the other set are connected in rotation to the second part.

---

The present invention relates to electromagnetic apparatus, such as clutches and brakes, adapted to transmit a torque between two parts at least one of which is a rotary part. The apparatus includes two sets of discs fixed in rotation to said two parts, respectively, each disc of one set being located between two discs of the other set, the whole of said two sets of discs being interposed between an abutment ring and the movable armature of an annular electromagnet, the abutment ring and the electromagnet yoke being prevented from moving axially with respect to said two parts whereas the electromagnet armature is movable axially with respect to them, the whole being such that, when the electromagnet is energized for transmission of a torque, the movable armature is urged toward the abutment ring and thus compresses the pack of friction discs together.

The chief object of the present invention is to provide an apparatus of this kind which is better adapted to meet the requirements of practice than those known up to the present time.

For this purpose, the apparatus according to the present invention is characterized by the fact that the discs are made at least partly of a magnetic material, so that the magnetic flux can flow therethrough between the movable armature and the abutment ring, both made of a magnetic material, and that the movable armature is disposed on the inside of an annular extension of the electromagnet yoke in such manner that there is a small annular gap between said annular extension and said movable armature, the whole being arranged so that energizing of the electromagnet moves the movable armature axially away from the magnetizing winding of the electromagnet.

A preferred embodiment of the present invention will be hereinafter described with reference to the appended drawings, given merely by way of example, and in which the only figure is a half sectional view of an electromagnetic clutch made according to the invention.

The clutch illustrated by the drawing comprises an annular electromagnet including yoke 1 and winding 2, to which current is fed through a cable 3. This yoke 3 is disposed on a hub 5 of a magnetic material, with the interposition of a ball bearing 4 adapted to keep hub 5 axially fixed with respect to yoke 1. Hub 5 is provided with a central passage 6 adapted to receive a shaft (not shown), said hub 5 constituting the first rotary part of the clutch. Yoke 1 forms, with hub 5, a narrow annular radial air gap 7.

A splined ring 8 of a non-magnetic material is fixed on hub 5. A flange 9 of a magnetic material, including an abutment ring 10, is fixed to the end of hub 5.

Splined ring 8 permits the axial sliding, without relative rotation, of a set of discs 11 of a magnetic material and of a ring 12 also of a magnetic material, discs 11 being located between abutment ring 10 and ring 12. This ring 12 is located inside an annular extension 1a of yoke 1 so as to form therewith a narrow annular radial air gap 13. Ring 12 thus constitutes an armature of the electromagnet movable axially between discs 11 and an abutment flange 8a provided at the end of ring 8 on the side thereof turned toward yoke 1.

The inner portion 1b of yoke 1 is at a sufficient distance from movable armature 12 to make the magnetic leakage between these two pieces negligible. As a matter of fact, practically the whole of the magnetic flux from portion 1b passes into hub 5 through gap 7. Thus, as clearly seen in the drawing, the armature 12 has a small radial air gap 13 radially outwards therefrom, a large radial non-magnetic gap radially inward therefrom, and a large axial nonmagnetic gap between itself and the winding 2.

The second rotary part of the clutch consists of a bell-shaped element 14 provided with longitudinal arms 15 between which lugs provided on the periphery of discs 16, made of a magnetic material, are slidable. Discs 16 are interposed between discs 11, so that a disc of one set is located between two discs of the other set. Expansible washers 17 are interposed between discs 11 so as to move them away from one another when the electromagnet ceases to be energized.

The apparatus above described therefore comprises the following elements disposed successively in the axial direction: yoke 1, movable armature 12, friction discs 11 and 16, flange 9 with its abutment ring 10, and bell-shaped part 14 the longitudinal arms 15 of which extend as far as movable armature 12.

It will be supposed that this clutch is intended to transmit a torque between a shaft on which hub 5 is fixed and a shaft on which bell-shaped element 14 is fixed. When both of these shafts are rotary shafts, the apparatus constitutes a clutch. If only one of the two shafts is capable of rotating, the apparatus constitutes a brake for said rotary shaft.

This apparatus works as follows:

When current flows through the electromagnet winding 2, the magnetic flux that is produced follows a path indicated by the dot.ed lines provided with arrows as shown by the drawing. The magnetic circuit is deformed to reduce its own reluctance. Accordingly, movable armature 12 moves axially away from winding 2 (whereas in the usual devices it would move toward it) and compresses the whole of discs 11 and 16 against abutment ring 10. The discs cooperate by friction so that a torque is transmitted between the two above mentioned shafts.

The devices according to the present invention have the following advantages:

As air gaps 7 and 13 are disposed radially, the lines of force which pass therethrough do not exert axial stresses upon ball bearings 4.

The magnetic flux passes only once through discs 11 and 16 so that these discs are very simple to make and can be made very strong.

Movable armature 12, which may be of light weight and have a low mechanical inertia, permits of obtaining very short times of response.

The shape of the parts permits of obtaining a small total volume.

As ring 12 can be moved toward flange 9 as discs 16 get worn, it is unnecessary to provide the usual adjustment means to compensate for wear.

In a general manner, while the above description discloses what is deemed to be practical and efficient embodiment of the present invention, said invention is not limited thereto as there might be changes made in the arrangement, disposition and form of the parts without departing from the principle of the invention as comprehended within the scope of the appended claims.

What I claim is:

1. An electromagnetic apparatus for transmitting torque between a first part and a second part, said two parts having a common axis and being adapted to be respectively connected to two shafts, and at least one of said two parts being rotatable about said axis, which apparatus comprises, in combination:

an annular abutment member coaxial with said axis, fixed with respect to said first part, an annular electromagnet coaxial with said axis, spaced axially apart from said annular abutment member, said electromagnet including a winding and a yoke which surrounds said winding except for an annular portion of said winding facing said annular abutment member, which annular portion is left free, said yoke including an outer cylindrical extension extending beyond said winding axially toward said annular abutment member, said annular abutment member and said first part both being made of magnetic materials, two sets of annular friction discs, coaxial with said axis, and disposed between said annular abutment member and said electromagnet, said discs being made at least partly of a magnetic material, and lying in planes transverse to said axis, and said discs being slidable axially with respect to said annular abutment member and with respect to said second part, one of said sets being fixed angularly with respect to said annular abutment member, and the other set being fixed angularly with respect to said second part, the discs of one set being disposed alternately with the discs of the other set, and an annular armature coaxial with said axis, disposed between said discs and said electromagnet, radially inward of said cylindrical yoke extension with a small radial air gap radially outwards of said armature between said armature and said extension, a large radial non-magnetic gap radially inwards of said armature, and a large axial non-magnetic gap between said armature and said winding, said yoke, said armature, said two sets of discs, said abutment member, and said first part forming a closed magnetic circuit, whereby when said electromagnet is energized, said armature moves axially away from said winding towards said abutment member, and thus co-operates with said abutment member to compress together, between said armature and said abutment member, the two sets of discs.

2. An electromagnetic apparatus according to claim 1 further comprising a ring of non-magnetic material provided with longitudinal splines and rigidly secured to said abutment annular member coaxially therewith, the discs of said one set being slidable in the splines of said ring.

3. A clutch according to claim 2 in which said first part is in the form of an annular hub (of a magnetic material) coaxial with said yoke and journalled with respect thereto about said axis, with a small annular radial air gap between itself and said yoke, said annular hub being rigid with said abutment annular member, said yoke being fixed and said annular hub being journalled in said yoke.

References Cited

UNITED STATES PATENTS

| 2,057,876 | 10/1936 | Berry. | |
| 2,267,114 | 12/1941 | Lear et al. | 192—84 |
| 2,378,108 | 6/1945 | Ryba. | |
| 2,580,869 | 1/1952 | Winther. | |
| 2,933,171 | 4/1960 | Kraeplin | 192—84 |
| 3,300,008 | 1/1967 | Mendenhall. | |

FOREIGN PATENTS

| 1,101,812 | 4/1955 | France. |
| 659,890 | 4/1938 | Germany. |

MARTIN P. SCHWADRON, *Primary Examiner.*

C. LEEDOM, *Assistant Examiner.*